United States Patent [19]

Iida et al.

[11] Patent Number: 5,293,928

[45] Date of Patent: Mar. 15, 1994

[54] AIR-CONDITIONER FOR AUTOMOBILES

[75] Inventors: Katsumi Iida; Yoshihiko Sakurai; Akihiko Takano, all of Konan; Hideo Yamaguchi; Teruaki Yano, both of Fuchu, all of Japan

[73] Assignees: Zexel Corporation, Tokyo; Mazda Motor Corporation, Hiroshima, both of Japan

[21] Appl. No.: 71,001

[22] Filed: Jun. 4, 1993

Related U.S. Application Data

[62] Division of Ser. No. 640,631, Jan. 14, 1991, Pat. No. 5,244,035.

[30] Foreign Application Priority Data

Jan. 24, 1990 [JP] Japan ................... 2-14068
Jan. 24, 1990 [JP] Japan ................... 2-14069

[51] Int. Cl.$^5$ ......................... F25D 17/08; F25B 29/00
[52] U.S. Cl. ......................... 165/16; 165/43; 62/228.5; 62/203; 62/244; 62/180; 236/91 E; 236/91 F; 236/13; 237/2 A
[58] Field of Search ....... 165/42, 43, 16, 22; 236/91 E, 91 F; 237/2 A, 12.3 R, 12.3 B, 123 A; 62/228.5, 203, 244, 179, 180

[56] References Cited

U.S. PATENT DOCUMENTS

| | | | |
|---|---|---|---|
| 4,408,712 | 10/1983 | Naganoma et al. | 165/43 |
| 4,478,274 | 10/1984 | Naganoma et al. | 165/42 |
| 4,523,715 | 6/1985 | Ohsawa et al. | 165/43 |
| 4,685,508 | 8/1987 | Iida et al. | 165/43 |
| 4,791,981 | 12/1988 | Ito . | |
| 4,953,630 | 9/1990 | Iida . | |
| 4,962,302 | 10/1990 | Katsumi | 165/42 |
| 4,966,011 | 10/1990 | Iida | 165/42 |
| 4,966,012 | 10/1990 | Iida | 165/42 |
| 4,994,958 | 2/1991 | Iida . | |

FOREIGN PATENT DOCUMENTS 58-33509 2/1983 Japan .
63-34216 2/1988 Japan .
1-293218 11/1989 Japan .

Primary Examiner—John K. Ford
Attorney, Agent, or Firm—Wenderoth, Lind & Ponack

[57] ABSTRACT

An automobile air-conditioner wherein a controlled variable used to determine the control mode of a component of the air-conditioner is corrected or restricted according to the amount of shifting of the head part setting temperature for driving the component of the air-conditioner based on the corrected or restricted controlled variable. With this arrangement, an occupant of the automobile senses an enhanced change of the air-conditioning operation when the head part setting temperature is changed.

2 Claims, 14 Drawing Sheets

AIR-CONDITIONER FOR AUTOMOBILES

This is a divisional application of Ser. No. 07/640,631, filed Jan. 14, 1991, now U.S. Pat. No. 5,244,035.

BACKGROUND OF THE INVENTION

1. Field of the Invention

The present invention relates to an air-conditioner for automobiles of the type including a cool air bypass unit capable of controlling the temperature of an upper part of the vehicle passenger compartment in the vicinity of the head of an occupant, wherein a complex control of the operation of various components of the air-conditioner is performed according to the head part setting temperature so as to improve the feeling of comfort of the occupant.

2. Description of the Prior Art

There are known automobile air conditioners which include a cool air bypass system having a cool air outlet provided addition to heat, vent and defroster outlets for the occupant's face during the heating operation, thereby keeping the head cool and the feet warm. Attempts have been proposed to automatically drive a cool air bypass door under certain conditions for improving the feeling of comfort of the head part of the occupant. According to one such known proposal disclosed in Japanese Patent Laid-open Publication No. 63-34216, the cool air bypass door is driven to force cool air against the head of the occupant when two conditions are fulfilled, i.e. when the temperature of discharged air is higher than a predetermined level and the difference between the temperature of the passenger compartment and the setting temperature is greater than a predetermined level.

Japanese Patent Laid-open Publication No. 58-33509 discloses an attempt to improve the feeling of comfort of the head portion of the occupant without using the cool air bypass system. According to this attempt, the portion of an air-flow duct disposed downstream of a blower is separated into at least two air-flow passages and an air-mix door is provided in each of the air flow passages so that the conditioned air is discharged from the respective air-flow passages into two different portions of the vehicle passenger compartment.

In the conventional cool air bypass system disclosed in the first-mentioned Japanese Publication, the opening and closing operation of the cool air bypass door is unable to produce changes in temperature and flow rate of discharged air which are large enough to change the feeling of the head part of an occupant. The prior attempt disclosed in the last-mentioned Japanese publication is not satisfactory to provide a desired comfortable feeling even when a head part temperature setter is provided for controlling the temperature of the head part of the occupant. Further, the latter attempt is complicated in the structure.

SUMMARY OF THE INVENTION

With the foregoing difficulties in view, it is an object of the present invention to provide an automobile air-conditioner of the type including a cool air bypass door capable of controlling the temperature of an upper part of the vehicle passenger compartment in the vicinity of the head of an occupant, in such a manner that upon setting of a head part temperature setter, the occupant gets the feeling that the temperature and the flow rate of the discharged air are changed greatly.

According to a first aspect of the present invention, there is provided an air-conditioner for an automobile, comprising: an air-conditioning unit including an air-flow passage having upper and lower air outlets opening to a passenger compartment of the automobile, the air-conditioner unit being operative to selectively cool and heat air as the air flows downwardly through the air-flow passage so that the temperature of the air is regulated before the air is discharged from one of the upper and lower air outlets; a bypass passage for leading air to the upper outlet directly from a first portion of the air-flow passage which is located upstream of a second portion where the air is heated, the bypass passage having a bypass door for opening and closing the bypass passage; head part temperature setting means for setting a temperature of the head part of an occupant so as to control the opening of the bypass door; total signal calculation means for calculating a total signal corresponding to a thermal load in the passenger compartment based on at least temperature signals representing a vehicle passenger compartment temperature and a setting temperature; air-conditioning control calculation means for calculating various control modes of components of the air-conditioning unit by using the total signal as at least one factor; correction/restriction control calculation means responsive to a setting of the head part temperature setting means for calculating one of a correction variable and a restriction variable for correcting or restricting at least part of the control modes of the components of the air-conditioning unit which are calculated by the air-conditioning control calculation means; correction/restriction controlled variable determination means responsive to results of calculation by the correction/restriction control calculation means for determining a controlled variable through a correction or a restriction of the at least part of the control modes of the components of the air-conditioning unit which are calculated by the air-conditioning control calculation means; and drive means for driving the air-conditioning unit based on the controlled variable obtained by the correction/restriction controlled variable determination means.

With this arrangement, from the setting temperature, the passenger compartment temperature, the outside air temperature, etc., a total signal equivalent to the thermal load in the vehicle passenger compartment is calculated. This total signal is used at least as one factor to determine the various conditions of components of the air-conditioner including the discharge mode, the opening of the air-mix door, the capacity of the evaporator, the flow rate of the blower and the like. Under the conditions thus determined, the air-conditioning is started. Thereafter, the air-conditioning is shifted to an enhanced control mode in which all of or a part of foregoing conditions such as the discharge mode, the opening of the air-mix door, the capacity of the evaporator and the flow rate of the blower are corrected or restricted according to the setting of the head part temperature setting means. The components of the air-conditioning unit are operated complexly in accordance with the opening of the bypass which is varied by the setting of the head part temperature setting means. Thus, the air-conditioning feeling in the vicinity of the occupant's head can be improved.

According to a second aspect of this invention, there is provided an air-conditioner for an automobile, comprising: an air-conditioning unit including an air-flow passage having upper and lower air outlets opening to a passenger compartment of the automobile, the air-conditioner unit being operative to selectively cool and heat air as the air flows downwardly through the air-flow passage so that the temperature of the air is regulated before the air is discharged from one of the upper and lower air outlets; a bypass passage for leading air to the upper outlet directly from a first portion of the air-flow passage which is located upstream of a second portion where the air is heated, the bypass passage having a bypass door for opening and closing the bypass passage; head part temperature setting means for setting a temperature of the head part of an occupant so as to control the opening of the bypass door; total signal calculation means for calculating a total signal corresponding to a thermal load in the passenger compartment based on at least temperature signals representing a vehicle passenger compartment temperature and a setting temperature; air-conditioning control calculation means for calculating various control modes of components of the air-conditioning unit by using the total signal as at least one factor; correction/restriction control calculation means responsive to a setting of the head part temperature setting means for calculating one of a correction variable and a restriction variable for correcting or restricting at least part of the control modes of the components of the air-conditioning unit which are calculated by the air-conditioning control calculation means, the correction/restriction control calculation means including, at least, enhanced control calculation means for calculating a relatively large correction variable or a relatively large restriction variable, and moderate control calculation means for calculating a relatively small correction variable or a relatively small restriction variable; control mode selection means for selecting an output from the enhanced control calculation means in place of an output from the moderate control calculation means when the head part temperature setting means operates after the control of the air-conditioner reaches to a substantially stable condition; correction/restriction controlled variable determination means responsive to the result of selection by the control mode selection means for determining a controlled variable through a correction or a restriction of the at least part of the various control modes of the components of the air-conditioning unit which are calculated by the air-conditioning control calculation means; and drive means for driving the air-conditioning unit based on the controlled variable obtained by the correction/restriction controlled variable determination means.

With this construction, the setting temperature, the passenger compartment temperature, the outside air temperature, etc. are detected to calculate a total signal equivalent to the thermal load in the vehicle passenger compartment. This total signal is used to determine the various conditions of components of the air-conditioner including the discharge mode, the opening of the air-mix door, the capacity of the evaporator, the flow rate of the blower and the like. Under the conditions thus determined, the air-conditioning is started. After starting, the control of the air-conditioner is shifted to a moderate control mode in which all of or a part of the foregoing conditions such as the discharge mode, the opening of the air-mix door, the capacity of the evaporator and the flow rate of the blower are corrected or restricted by a relatively small variable according to the setting by the head part temperature setting means. When the head part temperature setting means is operated after the vehicle passenger compartment is air-conditioned substantially under a stable condition, the control is shifted to an enhanced control mode in which the conditions of the components of the air-conditioner are corrected or restricted by a variable which is larger than the variable used in the moderate control mode. The various components of the air-conditioner are operated complexly according to the shifting by the head part temperature setting means. Thus, the air-conditioning feeling in the vicinity of the head of the occupant is improved.

According to a third aspect of this invention, the enhanced control calculation means includes a plurality of control patterns each of which is selected by the temperature detected by an outside air temperature sensor.

Since the enhanced control means comprises a plurality of control patterns adapted to be selected according to the outside air temperature, the control of the head part temperature is performed in all seasons without imparting a sense of incompatibility to the occupant.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described hereinbelow in greater detail with reference to a first embodiment shown in FIG. 1 of the accompanying drawings.

Figure 1:
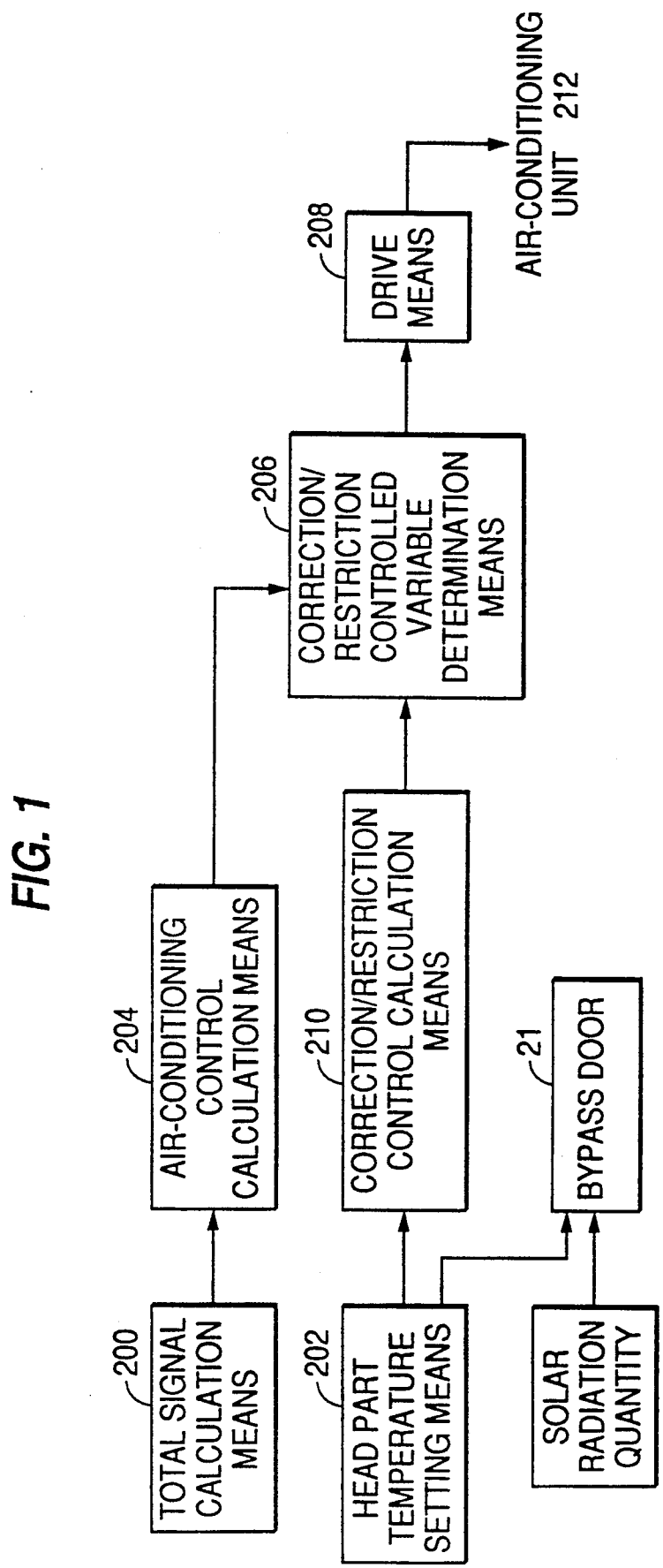
FIG. 1 is a functional block diagram of an automobile air-conditioner according to a first embodiment of the present invention.

As shown in FIG. 1, an automobile air-conditioner according to this invention comprises: an air-conditioning unit 212 including an air-flow passage having upper and lower air outlets opening to a passenger compartment of the automobile, the air-conditioner unit being operative to selectively cool and heat air as the air flows downwardly through the air-flow passage so that the temperature of the air is regulated before the air is discharged from one of the upper and lower air outlets; a bypass passage for leading air to the upper outlet directly from a first portion of the air-flow passage which is located upstream of a second portion where the air is heated, the bypass passage having a bypass door 21 for opening and closing the bypass passage; head part temperature setting means 202 for setting a temperature of the head part of an occupant so as to control the opening of the bypass door: total signal calculation means 200 for calculating a total signal corresponding to a thermal load in the passenger compartment based on at least temperature signals representing a vehicle passenger compartment temperature and a setting temperature; air-conditioning control calculation means 204 for calculating various control modes of components of the air-conditioning unit 212 by using the total signal as at least one factor; correction/restriction control calculation means 210 responsive to a setting of the head part temperature setting means 202 for calculating one of a correction variable and a restriction variable for correcting or restricting at least part of the control modes of the components of the air-conditioning unit which are calculated by the air-conditioning control calculation means 204; correction/restriction controlled variable determination means 206 responsive to results of calculation by the correction/restriction control calculation means 210 for determining a controlled variable through a correction or a restriction of the at least part of the control modes of the components of the air-conditioning unit which are calculated by the air-conditioning control calculation means 204; and drive means 208 for driving the air-conditioning unit 212 based on the controlled variable obtained by the correction/restriction controlled variable determination means 206.

Figure 2:
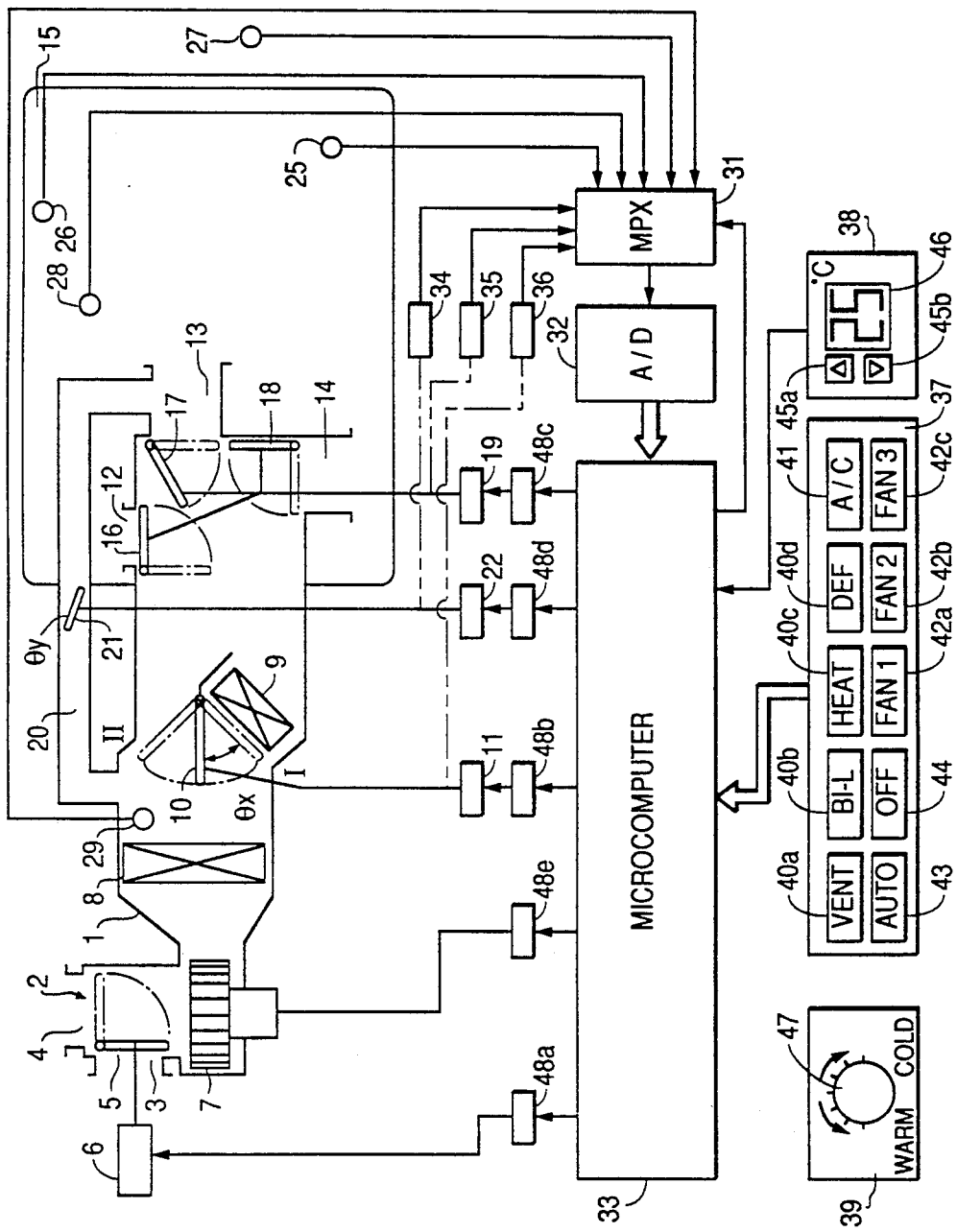
FIG. 2 is a diagrammatical view illustrative of the general construction of an automobile air-conditioner according to this invention.

As shown in FIG. 2, the automobile air-conditioner includes a main air-flow passage or duct 1 having an intake door changeover device 2 disposed at the upstream end of the main air-flow duct 1. The intake door changeover device 2 includes a selecting door 5 disposed at the junction between a recirculated air inlet 3 and an outside air inlet 4 that are provided in bifurcated fashion. The selecting door 5 is actuated by an actuator 6 to select the outside air or the recirculated air to be introduced into the main air-flow duct 1.

A blower 7 is disposed in the duct 1 adjacent to the air inlets 3, 4 for forcing the air to flow downstream through the main air-flow duct 1. The duct 1 also includes an evaporator 8 and a heater core 9 disposed downstream of the blower 7 in the order named.

The evaporator 8 is connected in fluid circuit with a compressor and other components (not shown) so as to jointly constitute a refrigeration cycle or system for cooling air passing around the evaporator 8. The heater core 9 serves to heat air passing therearound with the agency of heat exchange action between the air and an engine cooling water circulating through the heater core 9. Disposed in front of the heater core 9 is an air-mix door 10 pivotally movable by an actuator 11 for varying the ratio of the amount of air flowing directly through the heater core 9 to the amount of air bypassing the heater core 9 depending on the opening $\theta x$ of the air-mix door 10. The air passed through the heater core 9 and the air bypassed the heater core 9 are then mixed up into temperature-conditioned air of a desired temperature.

The opening $\theta x$ of the air-mix door 10 is 0% when the air-mix door 10 is located at the full cool position indicated by I in FIG. 2 and 100% when the air-mix door 10 is located at the full heat position indicated by II in the same figure.

The main air-flow duct 1 has at its downstream end a defroster outlet 12, an upper outlet 13 and a lower outlet 14 that are provided in branched fashion and all open to a vehicle passenger compartment 15. Three mode doors 16, 17, 18 are disposed at the respective outlets 12, 13, 14 and adapted to be selectively opened and closed by an actuator 19 to set a desired discharge mode of the air-conditioner.

The air-conditioner further includes a bypass passage or duct 20 for bypassing a length of the main air-flow duct 1. The bypass duct 20 has one end connected to the main air-flow duct 1 at a position between the evaporator 8 and the air-mix door 10, the opposite end of the bypass duct 20 being connected to the main air-flow duct 1 at a position in front of the upper outlet 13 so that a part of air having passed through the evaporator 8 is directly supplied to the upper outlet 13. The amount of cool air supplied through the bypass duct 20 is adjusted by controlling the opening $\theta y$ of a cool air bypass door 21 by means of an actuator 22.

Denoted by 25 is a representative temperature sensor disposed on an instrument panel, for example, of the automobile for detecting a representative temperature Tr in the passenger compartment 15. A head part temperature sensor 26 is disposed on the inside surface of the roof panel of the automobile for detecting a temperature Trh in the vicinity of the head of an occupant of the passenger compartment 15. Designated by 27 is an outside air temperature sensor for detecting an outside air temperature Ta and 28 is a solar radiation sensor for detecting a solar radiation quantity Ts. An evaporator discharged air temperature sensor 29 is disposed on or immediately downstream of the evaporator 8 for detecting a cooling capacity of the evaporator 8 in terms of a temperature of the evaporator 8 or a temperature of air passed through the evaporator 8. Output signals from the respective sensors 25-29 are selected by a multiplexer (MPX) 31, then converted by an A/D converter 32 into digital signals which in turn are inputted into a microcomputer 33.

Reference numeral 34 denotes a first opening sensor for detecting the opening $\theta y$ of the cool air bypass door 21, 33 a position sensor for detecting the position of the respective mode doors 16, 17, 18, and 36 a second opening sensor $\theta x$ for detecting the opening of the air-mix door 10. Output signals from these sensors 34, 35, 36 are supplied through the multiplexer 31 and the A/D converter 32 to the microcomputer 33.

The microcomputer 33 is also supplied with output signals from a control panel 37, a temperature setter 38 and an upper part temperature setter 39.

The control panel 37 is provided with mode switches 40a-40d for manually setting the discharge mode among the vent (VENT) mode, the bi-level (BI-L) mode, the heat (HEAT) mode, and the defrost (DEF) mode, an A/C switch 41 for starting the aforesaid refrigeration cycle, fan switches 42a-42c for selecting the rotational speed of the blower 7 between a low speed (FAN1), an intermediate speed (FAN2) and a high speed (FAN3), an auto switch (AUTO) 43 for automatically controlling all the components of the air-conditioner including the blower 7, and an off switch (OFF) for stopping the operation of the air-conditioner.

The temperature setter 38 is composed of up and down switches 45a, 45b and an indicator or display 46 for indicating a setting temperature. The setting temperature indicated on the display 46 can be varied within a predetermined range by properly actuating the up and down switches 45a, 45b. The head part temperature setter 39 has a graduated disk or dial 47 adapted to be turned in opposite directions to vary the head part setting temperature Ths within a predetermined range (composed of five notches toward the COLD side and five notches toward the WARM side). The temperature setter 38 and the head part temperature setter 39 may be of the slide type having a slidable temperature regulating lever.

The microcomputer 33 is of the conventional type known per se and includes a central processing unit (CPU), a read only memory (ROM), a random access memory (RAM), an input/output port (I/O), etc. (one of them being shown). The microcomputer 33 serves to calculate control signals based on the various input signals stated above and output the control signals to the actuators 6, 11, 19, 22, and a motor of the blower 7, respectively through driver circuits 48a-48e so as to control the operation of the respective doors 5, 10, 16, 17, 18, 21, and the rotation of the blower motor.

Figure 3:
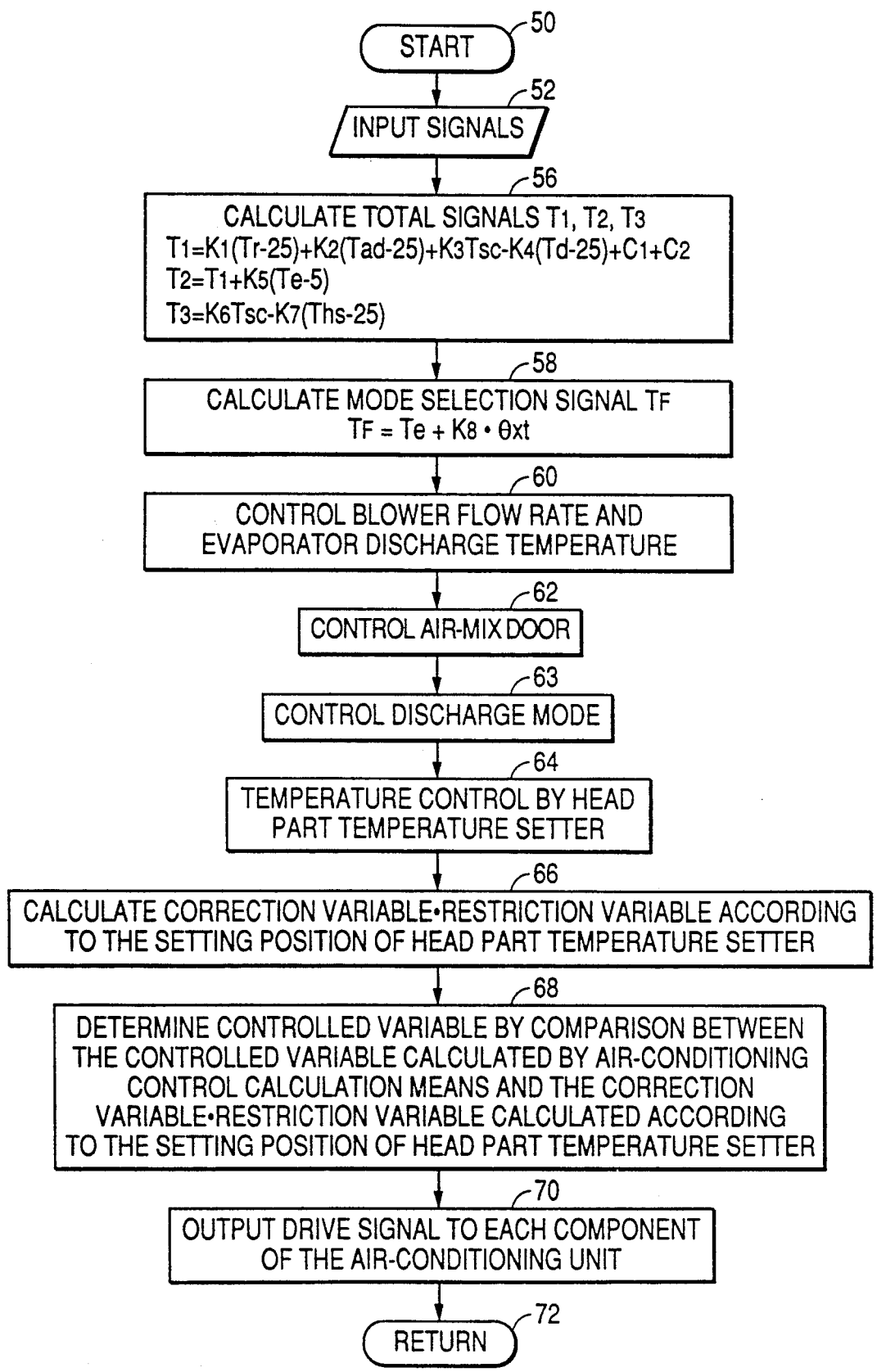
FIG. 3 is a flowchart showing a main control routine achieved by a microcomputer incorporated in the automobile air-conditioner shown in FIG. 2.

FIG. 3 shows a flowchart of a main control routine achieved by the microcomputer 33 for controlling the operation of the air-conditioner according to this invention.

The main control routine of the microcomputer 33 starts in a step 50 in accordance with a program stored in the microcomputer 33. In the next step 52, various signals Ta, Tr, Trh, Ts, Te indicative of thermal loads detected by the outside air temperature sensor 26, the representative compartment temperature sensor 25, the head part temperature sensor 26, the solar radiation sensor 28, the evaporator discharge air temperature sensor 29, etc. are inputted in the microcomputer 33.

Thereafter, the control proceeds to a step 56 in which a total signal $T_1$ is calculated in accordance with the expression (1) on the basis of the signals inputted in the step 52, the total signal $T_1$ is equal to the thermal loads in the vehicle passenger compartment.

$$T_1 = K_1(Tr-25) + K_2(Tad-25) + K_3Tsc - K_4(Td-25) + C_1 + C_2 \quad (1)$$

where $K_1$-$K_4$ are calculation coefficients, $C_2$ is a calculation constant, Tad is a value obtained from the outside air temperature Ta through a predetermined signal delay processing, and Tsc is a value obtained from the solar radiation quantity through a predetermined signal processing. These signal processing operations are not described here.

Further, $C_1$ in the expression (1) is determined by the following expression (2).

$$C_1 = K_5(O-Tad) \quad (2)$$

where $K_5$ is a calculation coefficient. This expression is applied only when Tad is lower than 0° C., and $C_1=0$ when Tad is higher than 0°.

Another total signal $T_2$ used for the control of the opening of the air-mix door is calculated based on the total signal $T_1$ and the evaporator discharge temperature Te added as a control factor, in accordance with the following equation (3).

$$T_2 = T_1 + K_6(Te-5) \quad (3)$$

where $K_6$ is a calculation coefficient. Still another total signal $T_3$ (head part total signal) used for the control of the opening of the cool air bypass door is calculated according to the following expression (4).

$$T_3 = K_7 \cdot Tsc - K_8(Ths-25) \quad (4)$$

where $K_7$ and $K_8$ are calculation coefficients, Tsc is defined above and Ths is the head part setting temperature. These calculations are followed by a step 58.

The step 58 calculates a $T_F$ signal according to the following expression (5). The $T_F$ signal is used as a criterion for the selection of the discharge mode.

$$T_F = Te + K_9 \cdot \theta xt \quad (5)$$

where Te is the evaporator discharge temperature, $K_9$ is a calculation coefficient, and $\theta xt$ is the target air-mix door opening. Then, the control advances to a step 60.

Figure 4:
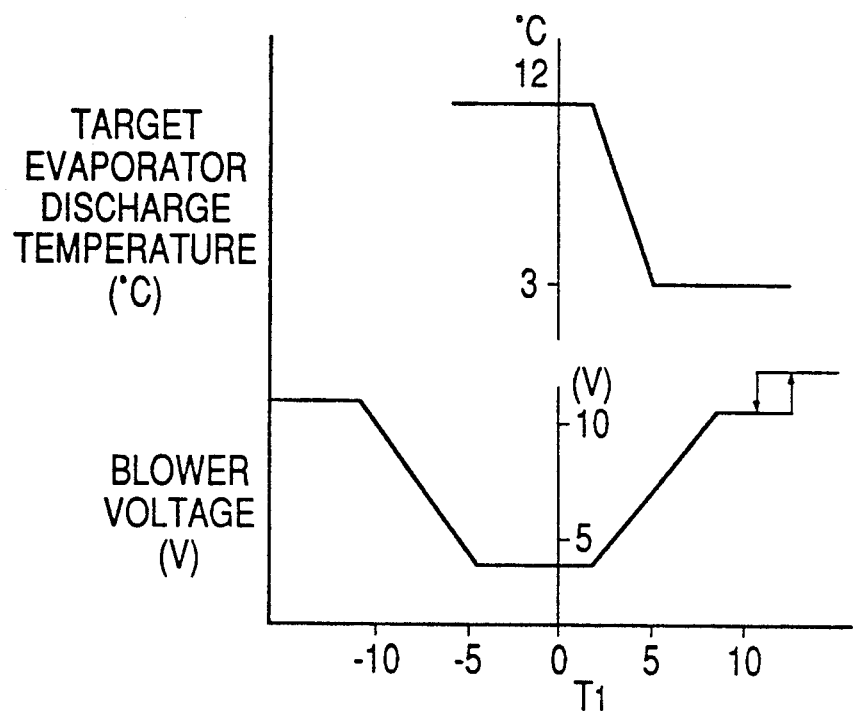
FIG. 4 is a graph showing the correlation between the target evaporator discharge temperature and the blower voltage that are taken with respect to the total signal $T_1$.

The step 60 controls the flow rate of the blower 7 (voltage of the blower) and the discharge temperature of the evaporator 8 in the manner as shown in FIG. 4, based on the total signal $T_1$ obtained by the expression (1) described above. Subsequently, the control proceeds to a step 62.

Figure 5:
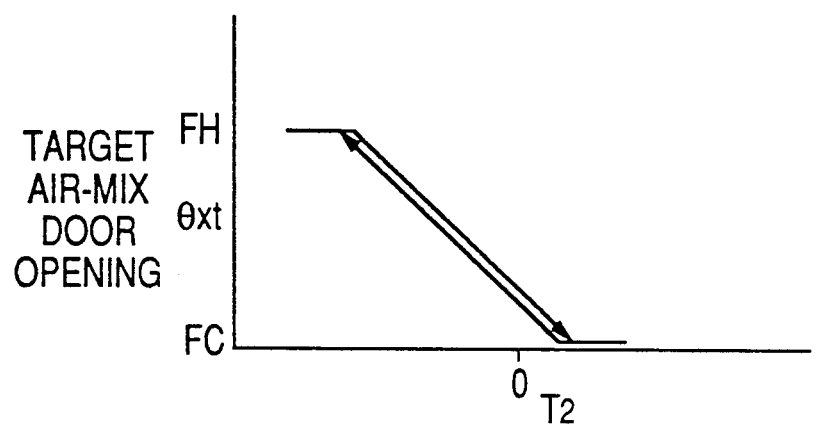
FIG. 5 is a graph showing the relationship between the target air-mix door opening and the total signal $T_2$.

The step 62 controls the operation of the air-mix door 10 in the manner as shown in FIG. 5, based on the results of calculation for the total signal $T_2$ described above. Then, the control advances to a step 63.

Figure 6:
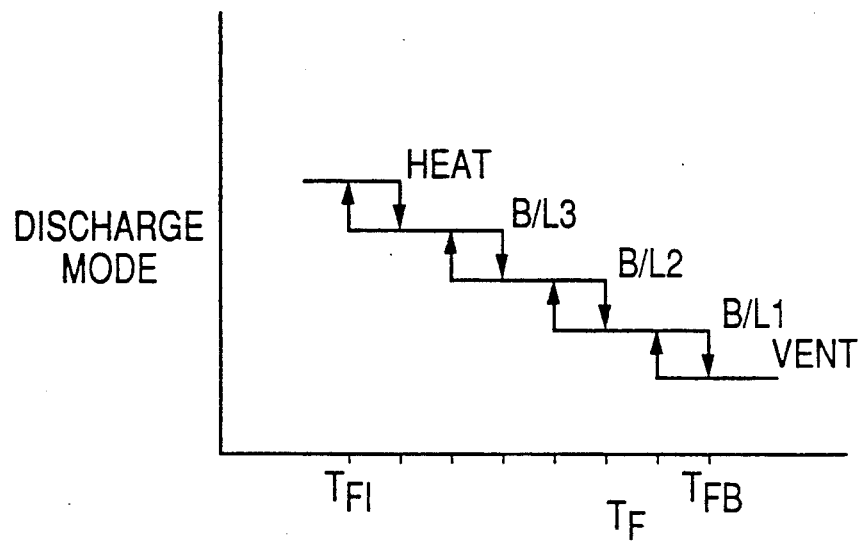
FIG. 6 is a graph showing the relationship between various discharge modes and the discharge mode selection judgment signal $T_F$.

The step 63 changeovers the discharge mode in the manner as shown in FIG. 6, based on the mode selection criterion $T_F$. Thereafter, the control proceeds to a step 64.

Figure 7:
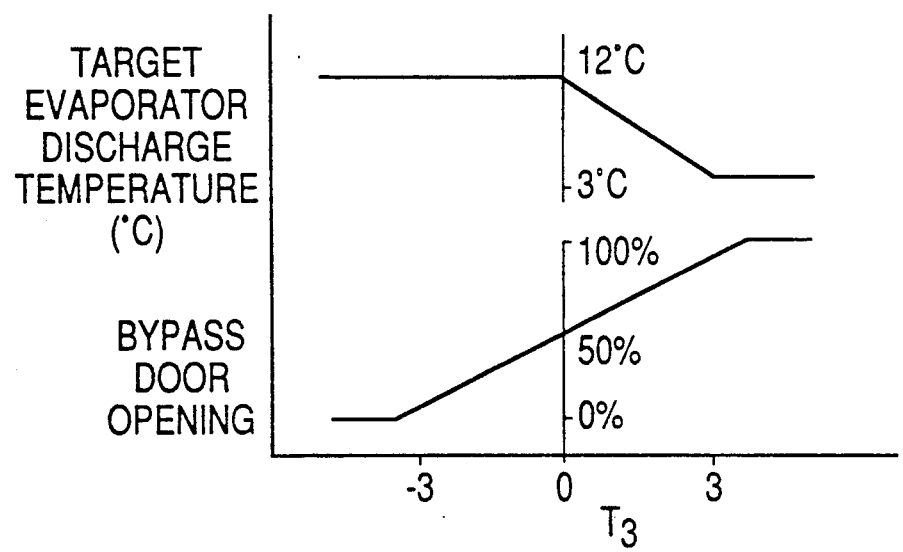
FIG. 7 is a graph showing the correlation between the target evaporator discharge temperature and the target air-mix door opening that are taken with respect to the total signal $T_3$.

The step 64 controls the bypass door 21 and the evaporator discharge temperature in the manner as shown in FIG. 7, based on the head part total signal $T_3$. Subsequently, the control advances to a step 66.

The step 66 calculates correction controlled variables and restriction variables of various components of the air-conditioner (the temperature of the evaporator 8, the opening of the air-mix door 10, the flow rate of the blower 7 and discharge mode) according to the setting value determined by the head part temperature setter 39. The calculation is achieved in accordance with a subroutine described later with reference to FIG. 8. This calculation step 66 is followed by a step 68.

The step 68 compares the correction variables and the restriction variables calculated by tee step 66 with these control variables obtained based on the total signals $T_1$, $T_2$ by the steps 60, 62, 63 to determine air-conditioning control variables. In this instance, preference is given to the correction variables and the restriction variables over the control variables. Then, the control proceeds to a step 70.

The step 70 outputs drive signals to the respective components of the air-conditioner, the drive signals being equivalent to the air-conditioning control variables obtained by the preceding step 68. After driving the components, the control advances to a return step 72.

Figure 8:
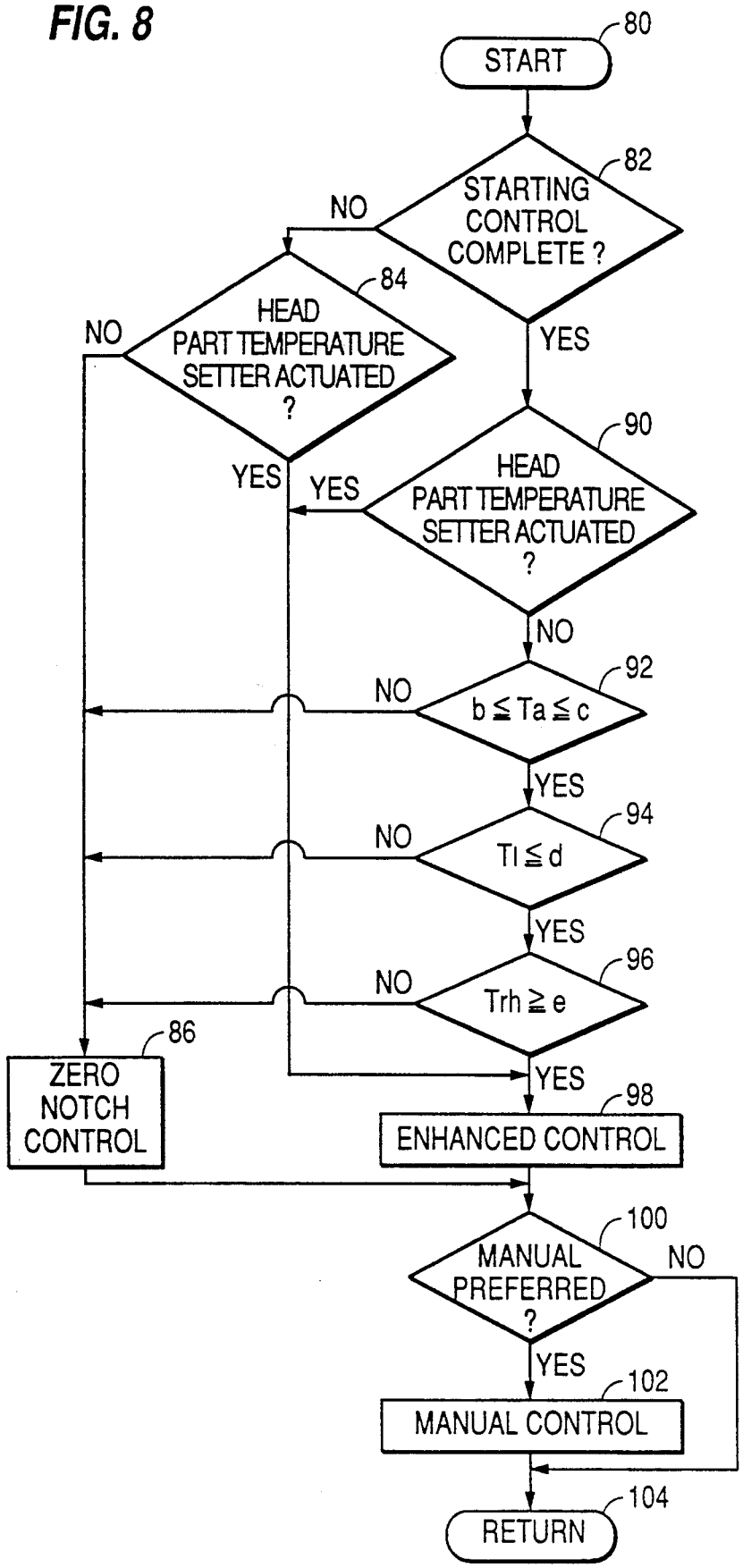
FIG. 8 is a flowchart showing a control subroutine achieved by the microcomputer for determination of the collected variable and the restricted variable according to the setting of the head part temperature.

Description will be given to the control subroutine shown in FIG. 8 and achieved for the determination of the correction variables and restriction variables of the respective components of the air-conditioner according to the setting of the head part temperature. This control is performed when the vent mode or the bi-level mode is selected automatically in the automatic control mode of operation and when the vent mode or the bi-level mode is set forcibly by manual setting of the head part temperature (except for manual selection of the discharge mode). This control subroutine starts from a step 80 and in the next step 82, a judgment is made to determine whether the air-conditioner starting control is completed or not (several minutes have passed after starting of the air-conditioner). If not completed, the control proceeds to a step 84. The step 84 makes a judgment whether setting of the head part temperature setter 39 is completed or not. If not completed, then the control proceeds to a step 86 to perform a zero notch control in which the temperature of the evaporator 8, the opening of the air-mix door 10, the flow rate of the blower 7 and the discharge mode are not corrected nor restricted. Conversely, if the setting of the head part temperature setter 39 has been completed, then the control advances to a step 98 to perform an enhanced control described later.

Figure 9:
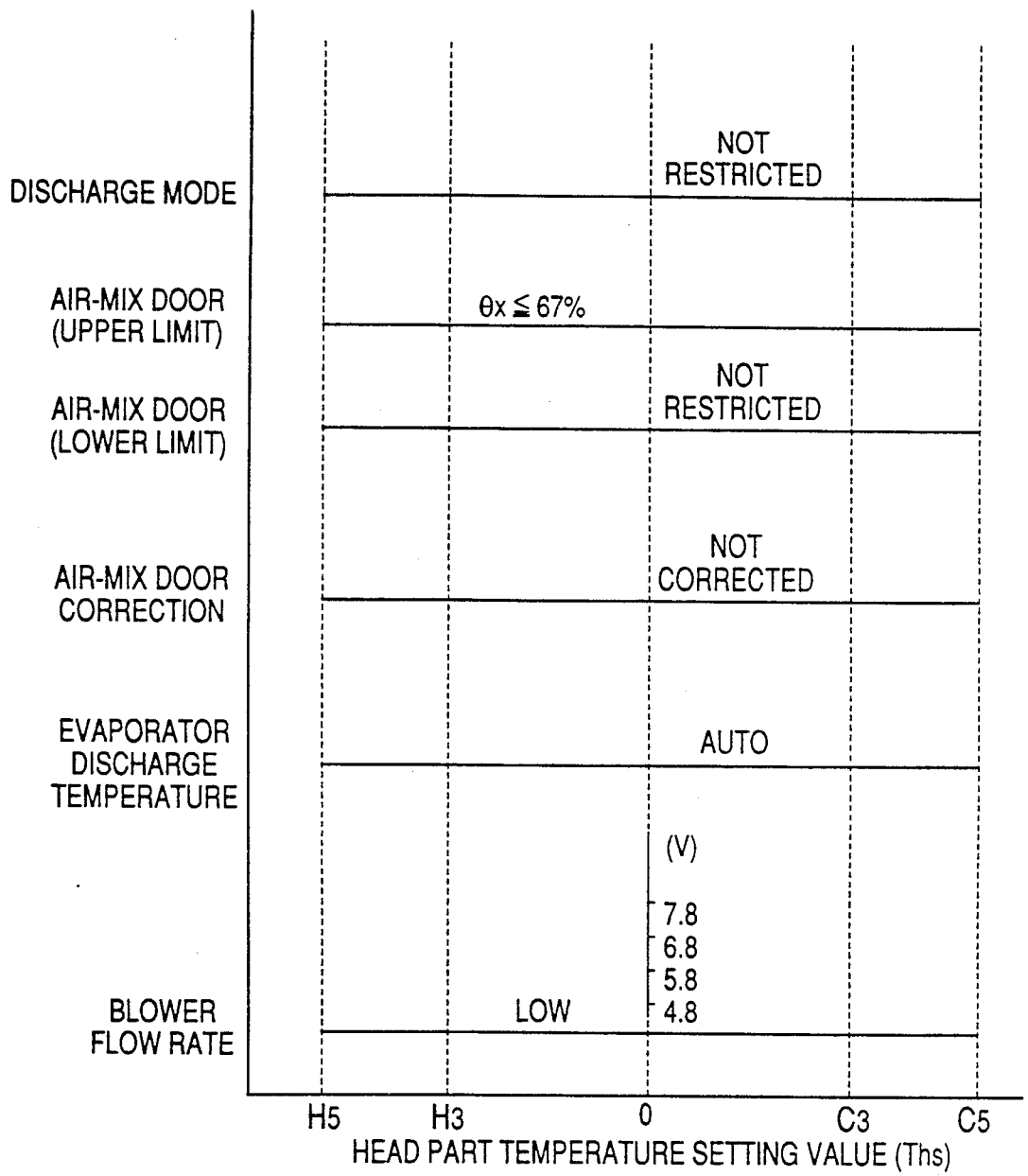
FIG. 9 is a graph showing various characteristic curves of the air-conditioner while it is operating in the zero notch control mode.

The zero notch control, as shown in FIG. 9, does not correct or restrict the discharged mode, the lower limit of the air-mix door opening, the evaporator discharge temperature and the flow rate of the blower regardless of whether the head part temperature setter 39 is displaced from the zero point to the cold side or alternately to the warm side except that to the turned in the cold side or in the warm, excepting that the upper limit of the air-mix door opening $\theta x$ is restricted to 67%.

If the decision in the step 82 indicates the completion of the engine starting control operation, the control advances to a step 90. The step 90 makes a judgment whether the head part temperature setter 39 is actuated or not. If yes, the control jumps to a step 98. If no, the control advances to a step 92 which makes a judgment whether the outside air temperature Ta is in the range of from b ($-5°$ C., for example) to c ($+28°$ C., for example). If yes, then the control advances to a step 94; if no on the contrary, this means that correction and restriction by the control of the head part temperature is not suited. Consequently, the control proceeds to the step 86 in which the zero notch control is performed.

The step 94 makes a judgment whether the total signal $T_1$ is smaller than a predetermined value d (5° C., for example). If $T_1 \leq d$, this means that heating is strongly needed. Then the control proceeds to the step 86 and hence correction and restriction by the head part temperature control are excluded. If no, the control advances to a step 96.

The step 96 makes a judgment whether the temperature detected by the head part temperature sensor Trh is greater than a predetermined value e ($+15°$ C., for example). If $Trh \geq e$, the control advances to the step 98 to perform the enhanced control.

As described above, after the zero notch control mode or the enhanced control mode is selected, the control advances to a step 100. In this step 100, if the discharge mode is one of the manual heat mode, the manual defrost mode and the manual defrost and heat mode, the temperature set by the temperature setter 38 is in the range of one of two opposite end extremities (18° C., 32° C., for example), and the blower 7 is stopped, this means that the control based on the setting of the head part temperature setter is not necessary. Accordingly, the control goes on to a step 102 in which the air-conditioner is operated in accordance with the instructions set by manual operation. Thereafter, the control advances to a return step 104 from which it returns to the main routine.

Figure 10:
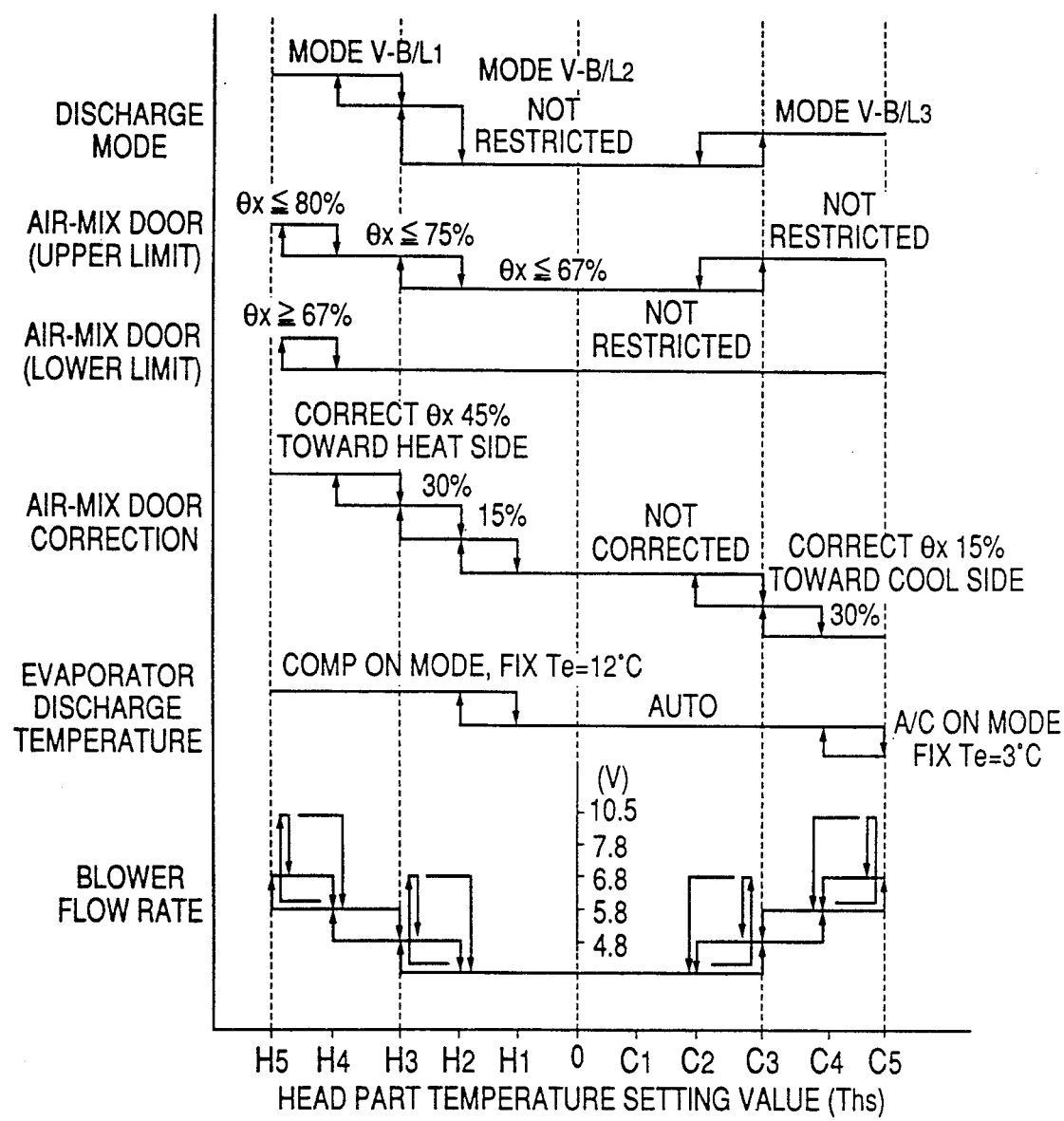
FIG. 10 is a graph showing the various characteristic curves of the air-conditioner while it is operating in the enhanced control mode

As shown in FIG. 10, under the enhanced control mode of operation, the discharge mode is not restricted when the head part setting temperature Ths is in the range between $H_3$ and $C_3$. When the head part setting temperature Ths is in the range between $H_3$ and $H_4$, the discharge mode is restricted to the vent mode (V), the first bi-level mode (B/L1) and the second bi-level mode (B/L2). In these discharge modes, the opening of the upper outlet 13 is relatively large. When the head part setting temperature Ths is in the range below $C_3$, the discharge mode is restricted to the vent mode (V), the first to third bi-level modes (B/L1-B/L3); an opening of the upper outlet 13 is also used.

In general, the discharge mode is automatically selected according to the discharge mode selection judgment signal $T_F$, as shown in FIG. 6. When the current discharge mode is the third bi-level mode (B/L3), if the head part temperature is set to the level $H_3$, the discharge mode is restricted to the second bi-level mode (B/L2). Accordingly, the discharge mode is shifted from the third bi-level mode (B/L3) to the second bi-level mode (B/L2).

The opening of the upper outlet 13 is 100% (fully opened) when the discharge mode is the vent mode. Similarly, in the first bi-level mode (B/L1), the opening of the upper outlet 13 is 80%. In the second bi-level mode (B/L2), the opening is 50%. In the third bi-level mode (B/L3), the opening is 20%. And, the opening of the upper outlet 13 is 0% (fully closed) when the discharge mode is the heat mode.

As shown in FIG. 10, under the enhanced control mode of operation, the opening $\theta x$ of the air-mix door 10 is restricted in its upper limit to $\theta x \leq 67\%$ when the head part setting temperature is in the range between $H_3$ and $C_3$. In the range higher than $H_3$, $\theta x \leq 75\%$. And $\theta x \leq 80\%$ when the head part setting temperature is higher than $H_5$. In the range exceeding $C_3$, no restriction of the opening $\theta x$ of the air-mix door 10 is performed. The opening $\theta x$ of the air-mix door 10 is restricted in its lower limit to $\theta x \geq 67\%$ only when the head part setting temperature is higher than $H_5$.

As shown in FIG. 10, the opening of the air-mix door 10 is corrected toward the heat side by 15% when the head part setting temperature Ths is in the range between $H_2$ and $H_3$. In the range between $H_3$ and $H_4$, the opening of the air-mix door 10 is corrected toward the heat side by 30%. Similarly, in the range higher than the $H_4$, the opening of the air-mix door 10 is corrected toward the heat side by 45%. In the range between $H_2$ and $C_3$, no correction is introduced in the control of the opening of the air-mix door 10. In the range between $C_3$ and $C_4$, the opening of the air-mix door 10 is corrected toward the cool side by 15%. Similarly, in the range exceeding $C_4$, the opening of the air-mix door 10 is corrected toward the cool side by 30%.

The restriction of the evaporator discharge temperature is carried out in the manner as shown in FIG. 10. More specifically, when the head part temperature is set in the range above $H_2$ during the compressor-on mode, the target discharge temperature of the evaporator 8 is fixed to $+12°$ C. In the range between $H_2$ and $C_5$, the evaporator discharge temperature is set to a value determined by the automatic control without involving any restriction to this value. When the heat part setting temperature is lower than $C_5$, the target discharge temperature of the evaporator 8 is set to 3° C. or a value which is obtained under the low temperature demist control mode.

The low temperature demist control is of the type known per se and widely used in the automobile air-conditioners of the type concerned. Furthermore, the low temperature demist control has no direct connection to this invention and hence a further description is no longer needed.

The restriction of the flow rate of the blower 7 is performed in terms of applied voltage of the blower. As shown in FIG. 10, when the head part setting temperature Ths is in the range between $H_3$ and $C_3$, the applied voltage is restricted to 4.8 V. In the range between $H_3$ and $H_4$, the applied voltage rises from 4.8 V to 7.8 V upon shifting and 20 seconds thereafter, the applied voltage is lowered to 5.8 V. voltage rises from 5.8 V to 10.5 V upon shifting and 20 seconds thereafter, the applied voltage is lowered to 7.8 V. In the range between $C_3$ and $C_4$, the applied voltage of the blower 7 rises from 4.8 V to 7.8 V upon shifting and 20 seconds thereafter, the applied voltage is lowered to 5.8 V. Likewise, in the range between $C_4$ and $C_5$, the applied voltage rises from 5.8 V to 10.5 V and 20 seconds thereafter, the applied voltage is lowered to 7.8 V. The temporarily rising of the applied voltage of the blower 7 is to create a strong stream of discharge air for a predetermined period of time so that the occupant senses an enhanced change of the state of air-conditioning operation when the head part temperature setter 39 is actuated.

If the upper part temperature setter 39 which is to be shifted from $H_1$ to $H_2$ overruns to $H_3$ and immediately thereafter is returned to $H_2$, the applied voltage of the blower 7 rises to 7.8 V and hence a strong stream of air is discharged. However, the discharge of such a strong stream of air does not continue for 20 seconds because the applied voltage of the blower 7 is immediately lowered to 4.8 V (see FIG. 10). Such immediate recovery of the desired applied voltage occurs also at the shifting between $H_5$ and $H_4$, between $C_2$ and $C_3$, and between $C_4$ and $C_5$.

The performance characteristics of the respective modes of the enhanced control which are shown in FIG. 10 are obtained when the dial 47 of the head part temperature setter 39 is turned from the zero point in either direction toward $H_5$ or $C_5$. These performance characteristics which are obtained when the dial 47 is returned from the $H_5$ or $C_5$ position to the zero point are shifted by one notch from the foregoing performance characteristics obtained when the dial 47 is turned in the forward direction. With this hysteresis characteristics, hunching of the components of the air-conditioner can be avoided.

As described above, when the starting control is not completed, the zero notch control is adopted. The components of the air-conditioner are, therefore, controlled automatically by the total signals $T_1$ and $T_2$ without any correction or restriction. When the head part temperature setter 39 is actuated after completion of the starting control, the enhanced control, is adopted to change the respective operation modes of the components of the air-conditioner. Thus, each time when the head part temperature setter 39 is actuated, a change of the state of air-conditioning is enhanced so that the product value of the air-conditioner is increased.

Figure 11:
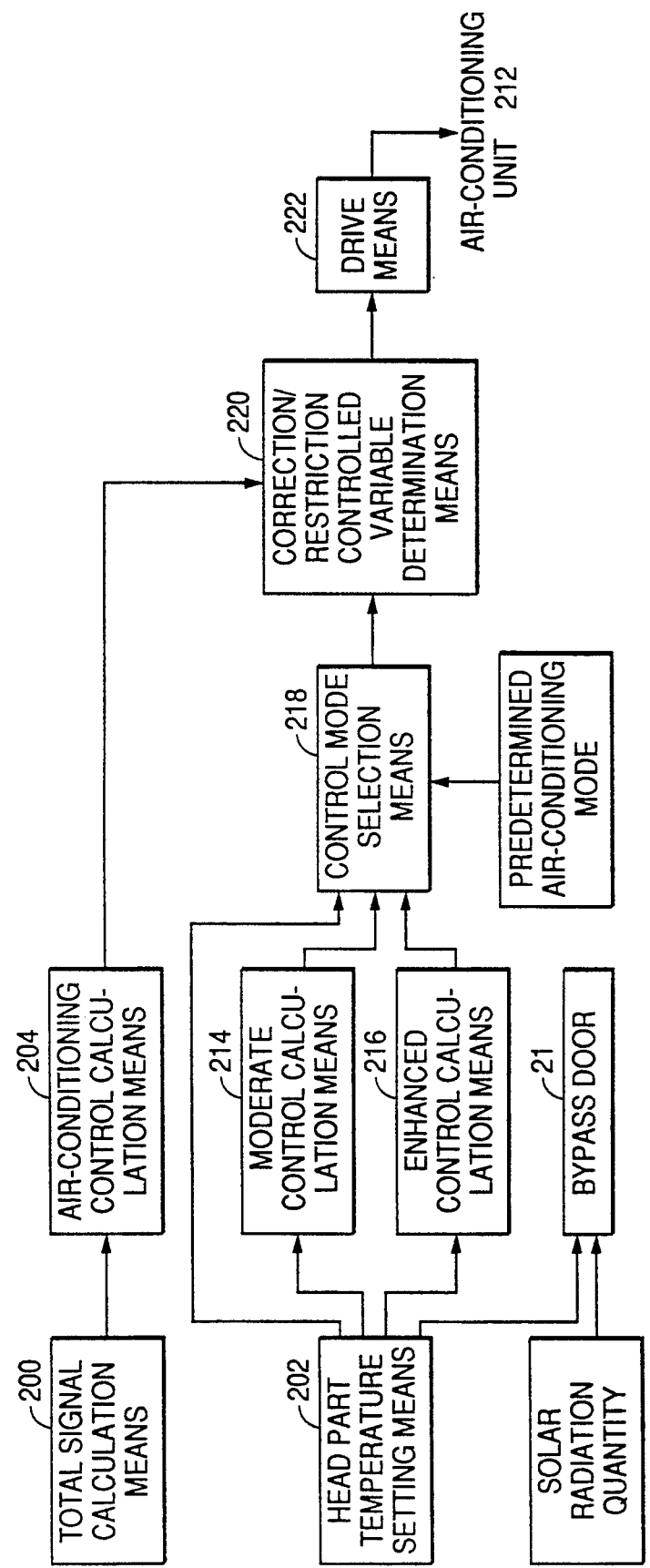
FIG. 11 is a functional block diagram of an automobile air-conditioner according to a second embodiment of this invention.

FIG. 11 shows the general construction of an automobile air-conditioner according to a second embodiment of this invention.

This air-conditioner comprises: an air-conditioning unit 212 including an air-flow passage having upper and lower air outlets opening to a passenger compartment of the automobile, the air-conditioner unit being operative to selectively cool and heat air as the air flows downwardly through the air-flow passage so that the temperature of the air is regulated before the air is discharged from one of the upper and lower air outlets; a bypass passage for leading air to the upper outlet directly from a first portion of the air-flow passage which is located upstream of a second portion where the air is heated, the bypass passage having a bypass door 21 for opening and closing the bypass passage; head part temperature setting means 202 for setting a temperature of the head part of an occupant so as to control the opening of the bypass door 21; total signal calculation means 200 for calculating a total signal corresponding to a thermal load in the passenger compartment based on at least temperature signals representing a vehicle passenger compartment temperature and a setting temperature; air-conditioning control calculation means 204 for calculating various control modes of components of the air-conditioning unit 212 by using the total signal as at least one factor; correction/restriction control calculation means responsive to a setting of the head part temperature setting means 202 for calculating one of a correction variable and a restriction variable for correcting or restricting at least part of the control modes of the components of the air-conditioning unit 212 which are calculated by the air-conditioning control calculation means 204, the correction/restriction control calculation means including, at least, enhanced control calculation means 216 for calculating a relatively large correction variable or a relatively large restriction variable, and moderate control calculation means 214 for calculating a relatively small correction variable or a relatively small restriction variable; control mode selection means 218 for selecting an output from the enhanced control calculation means 216 in place of an output from the moderate control calculation means 214 when the head part temperature setting means 202 operates after the control of the air-conditioner 212 reaches a substantially stable condition; correction/restriction controlled variable determination means 220 responsive to the result of selection by the control mode selection means 218 for determining a controlled variable through a correction or a restriction of the at least part of the various control modes of the components of the air-conditioning unit which are calculated by the air-conditioning control calculation means 204; and drive means 222 for driving the air-conditioning unit 212 based on the controlled variable obtained by the correction/restriction controlled variable determination means 220.

Figure 12:
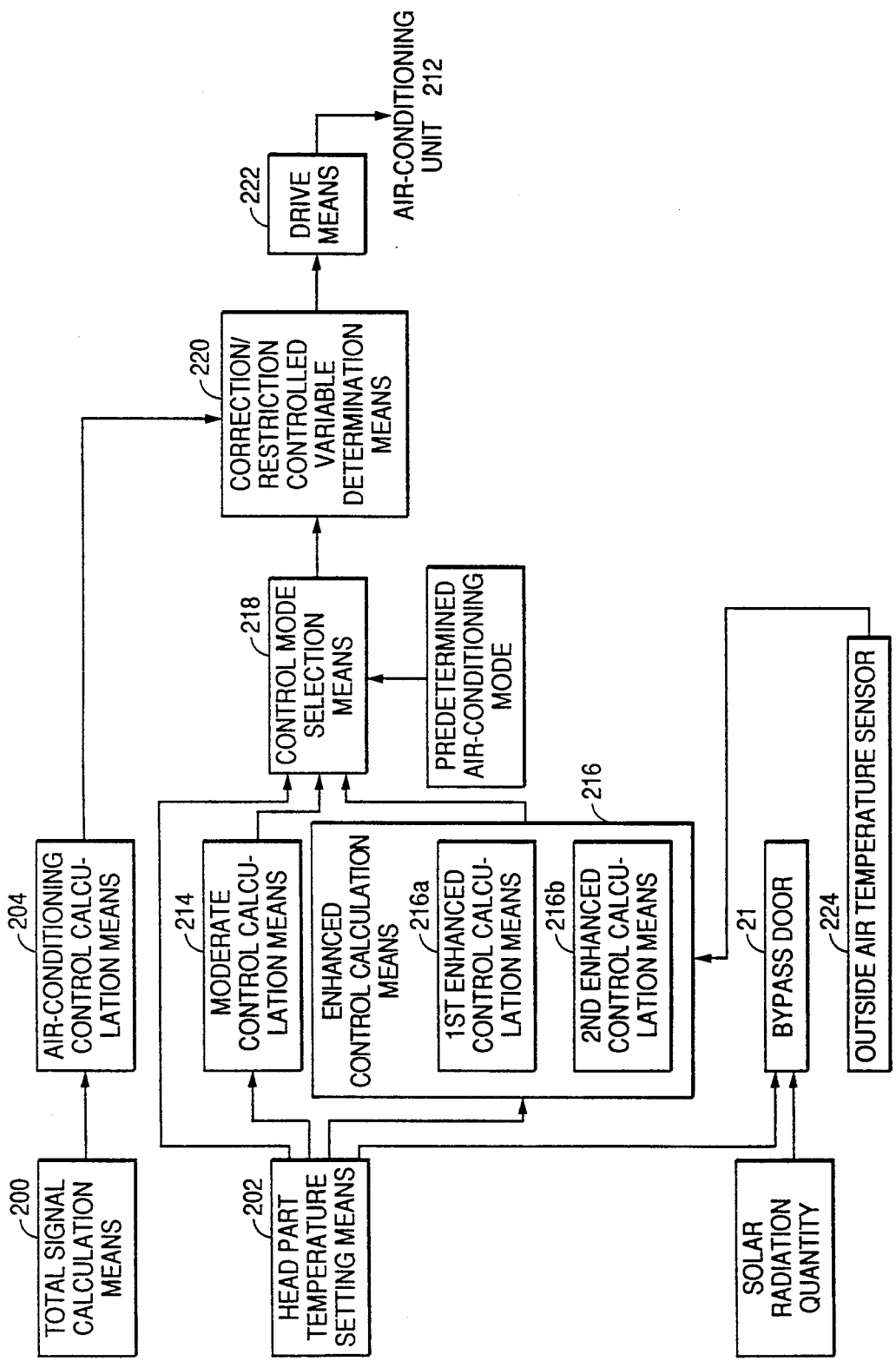
FIG. 12 is a functional block diagram of an automobile air-conditioner according to a third embodiment of this invention.

FIG. 12 shows the general construction of an automobile air-conditioner according to a third embodiment of this invention. The air-conditioner of this embodiment is substantially the same as the air-conditioner of the second embodiment shown in FIG. 11 with the exception that the enhanced control calculation means includes a plurality of control patterns. More specifically, the enhanced control calculation means 216 includes a first enhanced control pattern 216a and a second enhanced control pattern 216b. Either of the two enhanced control patterns 216a, 216b is selected according to the outside air temperature detected by an outside air temperature sensor 224.

The hardware of the air-conditioner of the first and second embodiments are identical to the hardware shown in FIG. 2 and hence a further description is no longer needed. Furthermore, a main control routine achieved by the microcomputer incorporated in each of these two air-conditioners is the same as the main control routine shown in FIG. 3 and a further description therefore is also not needed.

Figure 13:
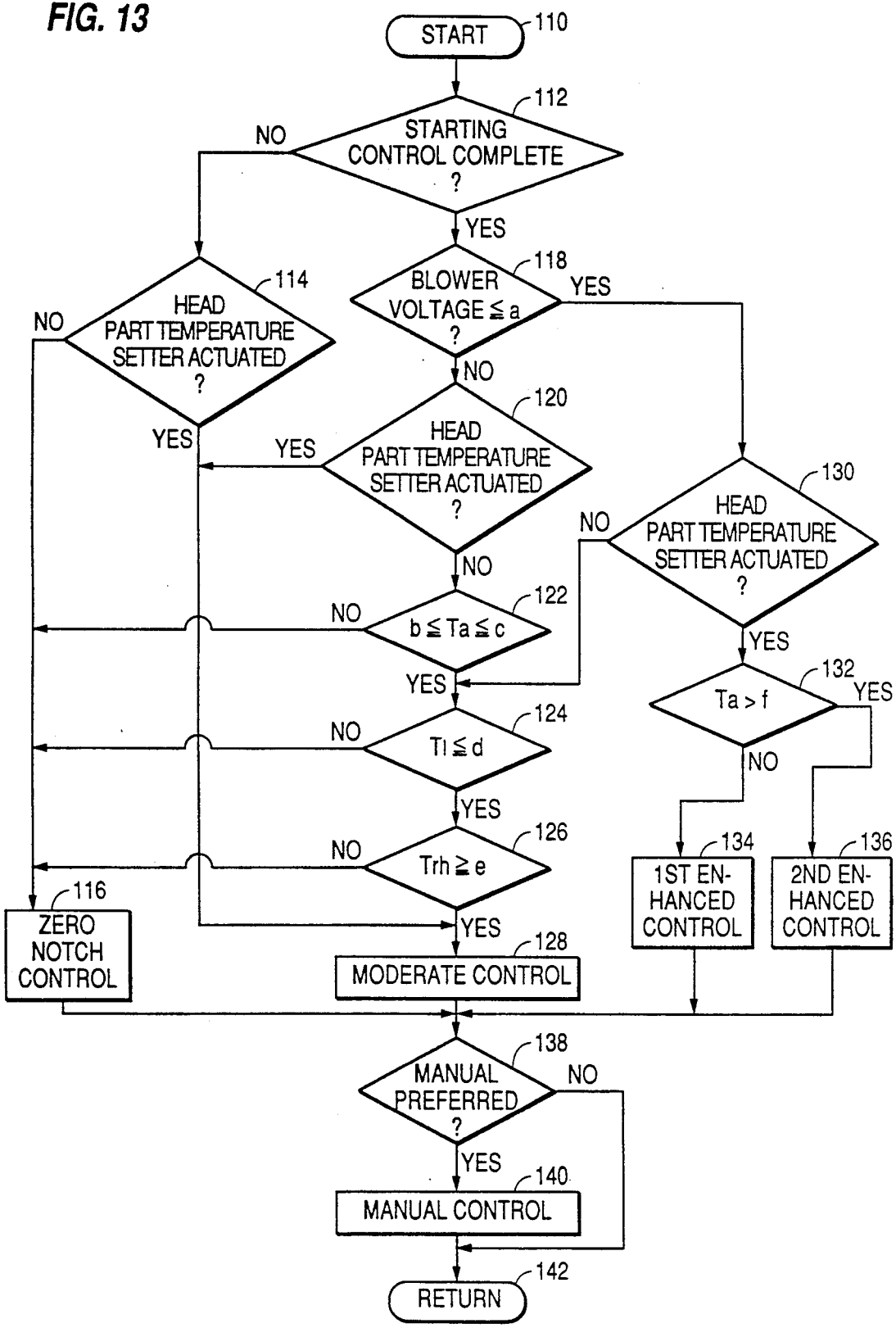
FIG. 13 is a flowchart showing a control subroutine achieved by the microcomputer for the determination of the corrected variable and the restricted variable according to the setting of the head part temperature.

A description will be given as to a control for determining a correction variable or a restriction variable which is given to a controlled variable of each component of the air-conditioner according to the setting of the head part temperature. This control is carried out when the discharge mode is changed automatically to the vent mode or to bi-level mode and when the discharge mode is changed forcibly by the setting of the head part temperature to the vent mode or the bi-level mode (except when the discharge mode is changed manually). As shown in FIG. 13, the control starts from a step 110 and in the next step 112, it is judged whether the start control of air-conditioning (air-cooling or air-heating) is completed or not. This judgment relies on the determination as to whether a predetermined time period such as several minutes elapses after the air-conditioner is started. If not completed, the control proceeds to a step 114. The step 114 makes a judgment whether setting of the head part temperature setter 39 is completed or not. If not completed, then the control proceeds to a step 116 to perform a zero notch control without involving any correction and restriction of the control mode. Conversely, if the setting of the head part temperature setter 39 has been completed, then the control advances to a step 128 to perform a moderate control described later.

The zero notch control, as shown in FIG. 9, does not correct or restrict the discharge mode, the lower limit of the air-mix door opening, the evaporator discharge temperature and the flow rate of the blower regardless of whether the head part temperature setter 39 is displaced from the zero point to the cold side or alternately to the warm side except that to the turned in the cold side or in the warm, excepting that the upper limit of the air-mix door opening $\theta x$ is restricted to 67%.

If the decision in the step 112 indicates the completion of the engine starting control operation, the control advances to a step 118. The step 118 makes a judgment whether the voltage of the blower 7 (which is applied under the automatic control mode) is smaller than the value a (8.5 V for example). This judgment is performed to determine whether the air-conditioning operation reaches a substantially stable condition (intermediate speed) or not. Any other suitable parameter may be used in place of the blower voltage. If the step 118 judges the blower voltage as being greater than a, this means that the air-conditioning operation is still unstable and hence in a transitional condition. In this case, the moderate control should be adopted. If a step 120 indicates that the head part temperature setter 39 is actuated, then the control jumps to the step 128 to perform the moderate control. If the head part temperature setter 39 is not actuated, the control advances to a step 122 which makes a judgment whether the outside air temperature Ta is in the range from b ($-5°$ C., for example) to c ($+28°$ C., for example). If yes, then the control advances to a step 124; if no on the contrary, this means that correction and restriction by the control of the head part temperature is not suited. Consequently, the control proceeds to the step 116 in which the zero notch control is performed.

The step 124 makes a judgment whether the total signal $T_1$ is smaller than a predetermined value d ($5°$ C., for example). If $T_1 \leq d$, this means that heating is strongly needed. Then the control proceeds to the step 116 and hence correction and restriction by the head part temperature control are excluded. If no, the control advances to a step 126.

The step 126 makes a judgment whether the temperature Trh detected by the head part temperature sensor is greater than a predetermined value e ($+15°$ C., for example). If $Trh \geq e$, the control advances to the step 128 to perform the enhanced control.

Figure 14:
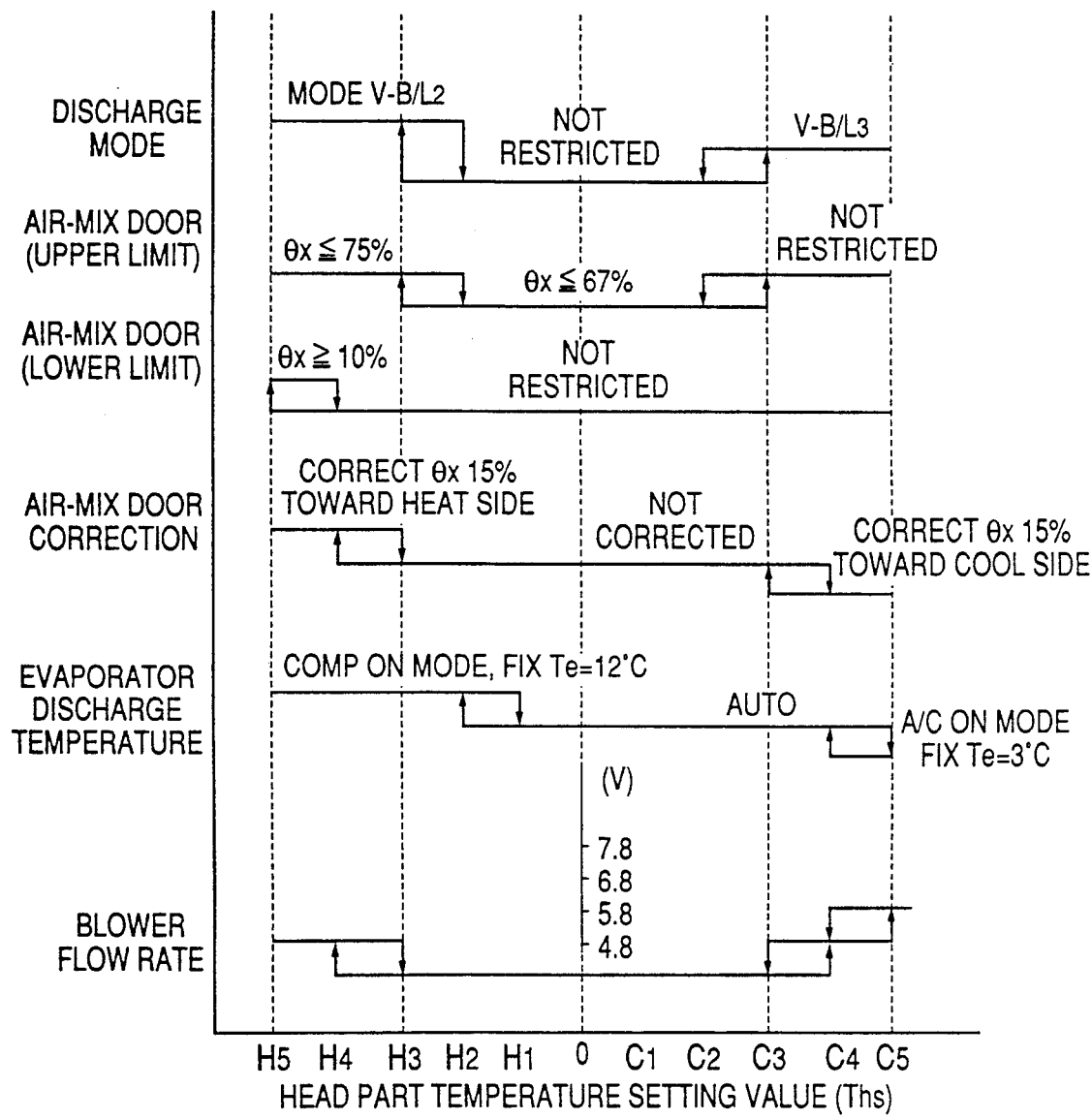
FIG. 14 is a graph showing various characteristic curves of the air-conditioner while it is operating in the moderate control mode.

As shown in FIG. 14, the moderate control is responsive to the setting value Ths of the head part temperature setter 39 to control or restrict the mode of each component of the air-conditioner more gently than the correction or restriction given in the enhanced control mode described later. For instance, when the head part setting temperature Ths is shifted in a direction toward the range exceeding H$_3$ (this direction is hereinafter referred as "heating direction"), the discharge mode is changed from the non-restricted condition to a restricted range between the vent mode (Vent) in which the upper outlet 13 is fully opened, and the second bi-level mode (B/L2) in which the upper outlet 13 has a relatively large opening. Conversely, when the head part setting temperature Ths is shifted in the opposite direction toward the range exceeding C$_3$ (this direction is hereinafter referred to as "cooling direction"), the discharge mode is changed from the non-restricted condition to a restricted range between the vent mode and the third bi-level mode (B/L3) in which the upper outlet 13 has a relatively small opening. The opening of the upper outlet 13 is 100% (fully opened) when the discharge mode is the vent mode. Similarly, in the first bi-level mode (B/L1), the opening of the upper outlet 13 is 80%. In the second bi-level mode (B/L2), the opening is 50%. In the third bi-level mode (B/L3), the opening is 20%. And, the opening of the upper outlet 13 is 0% (fully closed) when the discharge mode is the heat mode.

The discharge mode is automatically shifted according to the discharge mode selection judgment signal $T_F$, as shown in FIG. 6. When the current discharge mode is the third bi-level mode (B/L3), if the head part temperature is set to the level $H_3$, the discharge mode is restricted to the second bi-level mode (B/L2). Accordingly, the discharge mode is shifted from the third bi-level mode (B/L3) to the second bi-level mode (B/L2).

Under the moderate control mode of operation, the opening $\theta x$ of the air-mix door 10 is restricted in its upper limit to $\theta x \leq 67\%$ when the head part setting temperature is in the range between $H_3$ and $C_3$. In the range higher than $H_3$, $\theta x \leq 75\%$. In the range exceeding $C_3$, no restriction is given to the opening $\theta x$ of the air-mix door 10. The opening $\theta x$ of the air-mix door 10 is restricted in its lower limit to $\theta x \geq 10\%$ only when the head part setting temperature is higher than $H_5$. In the range between $H_5$ and $C_5$, no restriction is given to the opening $\theta x$ of the air-mix door 10. Likewise, in the range between $H_4$ and $C_4$, no correction is made to the opening $\theta x$ of the air-mix door 10. The opening $\theta x$ of the air-mix door 10 is corrected by 15% toward the heat side when the head part setting temperature is higher than $H_4$. Similarly, in the range exceeding $C_4$, the opening $\theta x$ of the air-mix door 10 is corrected by 15% toward the cool side.

The restriction of the evaporator discharge temperature is carried out in the manner as shown in FIG. 14. More specifically, when the head part temperature is set in the range above $H_2$ while the compressor is operating, except for a low temperature demist operation and a rapid cool-down operation, the target discharge temperature of the evaporator 8 is fixed to $+12°$ C. The low temperature demist operation is a demist control operation which starts when the outside air temperature is in a low temperature range such as between $-6°$ C. and $+6°$ C. In this low temperature demist operation, the power of the evaporator is intermittently set below the freezing start temperature so as to provide a sufficient demist capacity even under such a low outside air temperature condition. The rapid cool-down operation starts when the thermal load in the vehicle passenger compartment is high. In this rapid cool-down operation, the target temperature is set at $-10°$ C., for example, to lower the evaporator discharge temperature, thereby providing a sudden drop in the vehicle passenger compartment temperature. In the range between $H_2$ and $C_5$, the evaporator discharge temperature is set to a value determined by the automatic control without involving any restriction to this value. When the heat part setting temperature is lower than $C_5$, the target discharge temperature of the evaporator 8 is set to $3°$ C. or a value which is obtained under the low temperature demist control mode.

Restriction of the flow rate of the blower 7 is performed by changing the applied voltage of the blower 7. In the low flow rate range between $H_3$ and $C_3$, the applied voltage of the blower 7 is 4.8 V. In the range above $H_4$, the applied voltage is shifted from 4.8 V to 5.8 V. Similarly, in the range between $C_4$ and $C_5$, the applied voltage is set to 5.8 V. In the range exceeding $C_5$, the applied voltage rises to 6.8 V.

The moderate control is now described in greater detail. In the step 118, if the blower voltage becomes lower than 8.5 V, this means that the air-conditioning operation is substantially stable. Accordingly, the control proceeds to a step 130.

The step 130 makes a judgment whether the head part temperature setter 39 is actuated or not. If not, the current moderate control is performed. Conversely, if actuated, the control advances through a step 132 to an enhanced control.

The step 132 makes a judgment whether the outside air temperature TA is greater than a predetermined value f ($20°$ C. for example). Base on this judgment, a selection is made between a first enhanced control in a step 134 or a second enhanced control in a step 136. The first and second enhanced controls are designed to enhance the effects of the moderate control when the head part temperature setter 39 is actuated. The degree of enhancement is larger in the second enhanced control than in the first enhanced control.

After one of the zero notch control, the moderate control, the first enhanced control and the second enhanced control is selected, the control advances to a step 138. In this step 100, if the discharge mode is one of the manual heat mode, the manual defrost mode and the manual defrost and heat mode, the temperature set by the temperature setter 38 is in the range of one of two opposite end extremities ($18°$ C. and $32°$ C., for example), or the blower 7 is stopped, this means that the control (moderate control) based on the setting of the head part temperature setter is not necessary. Accordingly, the control proceeds to a step 140 in which the air-conditioner is operated in accordance with the instructions set by manual operation. Thereafter, the control advances to a return step 142 from which it returns to the main routine.

Figure 15:
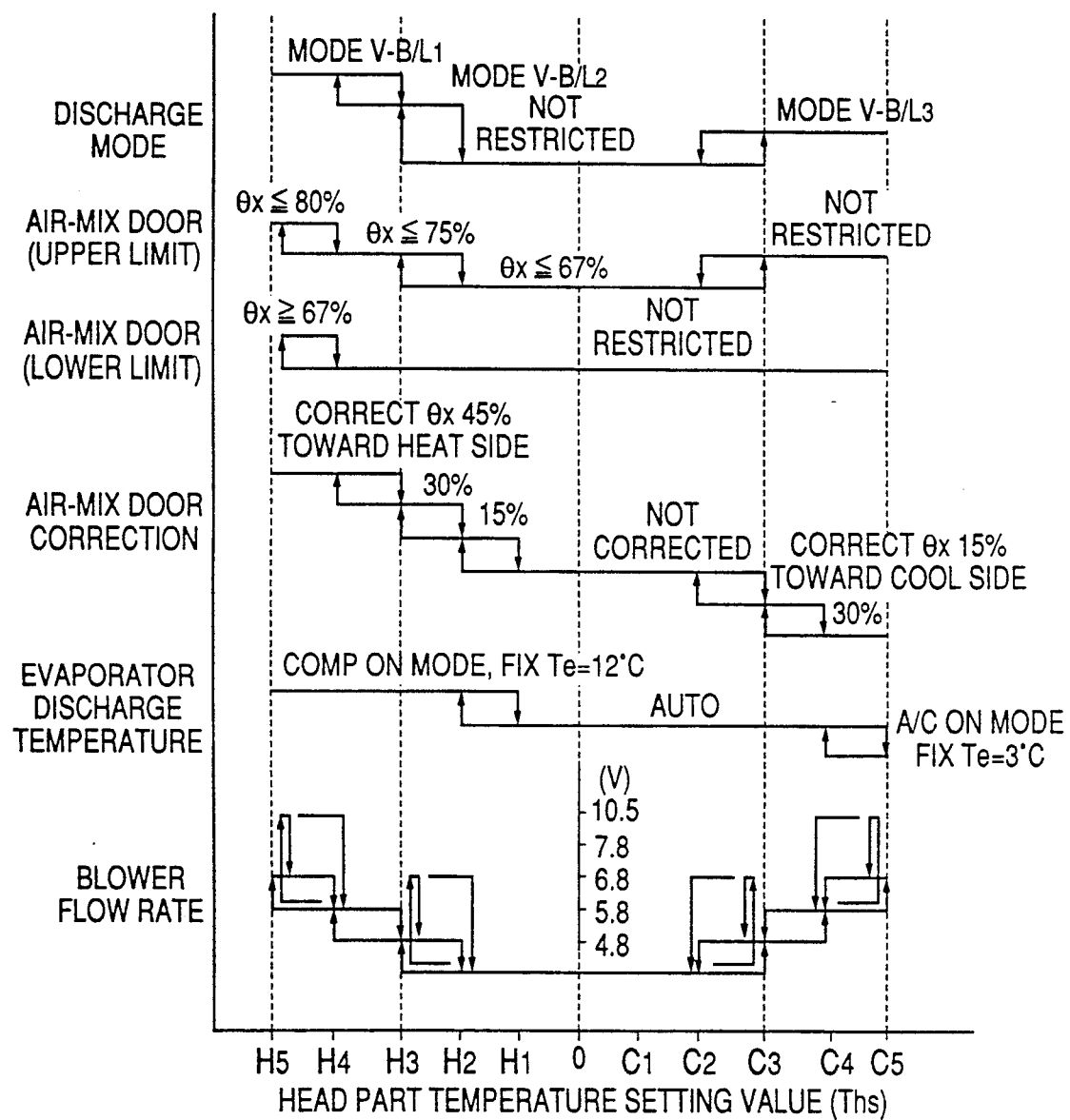
FIG. 15 is a graph showing various characteristic curves of the air-conditioner while it is operating in the first enhanced control mode.

As shown in FIG. 15, under the first enhanced control mode of operation, the discharge mode is not restricted when the head part setting temperature Ths is in the range between $H_3$ and $C_3$. When the head part setting temperature Ths is in the range between $H_3$ and $H_4$, the discharge mode is restricted to the vent mode (V), the first bi-level mode (B/L1) and the second bi-level mode (B/L2). In these discharge modes, the opening of the upper outlet 13 is relatively large. When the head part setting temperature Ths is in the range below $C_3$, the discharge mode is restricted to one of the vent mode (V), and the first to third bi-level modes (B/L1–B/L3); an opening of the upper outlet 13 is also used.

The opening $\theta x$ of the air-mix door 10 is restricted in its upper limit to $\theta x \leq 67\%$ when the head part setting temperature is in the range between $H_3$ and $C_3$. In the range higher than $H_3$, $\theta x \leq 75\%$. And $\theta x \leq 80\%$ when the head part setting temperature is higher than $H_5$. In the range exceeding $C_3$, no restriction is given to the opening $\theta x$ of the air-mix door 10. The opening $\theta x$ of the air-mix door 10 is restricted in its lower limit to $\theta x \geq 67\%$ only when the head part setting temperature is higher than $H_5$.

The opening of the air-mix door 10 is corrected toward the heat side by 15% when the head part setting temperature Ths is in the range between $H_2$ and $H_3$. In the range between $H_3$ and $H_4$, the opening of the air-mix door 10 is corrected toward the heat side by 30%. Similarly, in the range higher than the $H_4$, the opening of the air-mix door 10 is corrected toward the heat side by 45%. In the range between $H_2$ and $C_3$, no correction is introduced in the control of the opening of the air-mix door 10. In the range between $C_3$ and $C_4$, the opening of the air-mix door 10 is corrected toward the cool side by 15%. Similarly, in the range exceeding $C_4$, the opening of the air-mix door 10 is corrected toward the cool side by 30%.

The restriction of the evaporator discharge temperature is carried out in the manner as shown in FIG. 15.

More specifically, when the head part temperature is set in the range above $H_2$ during the compressor-on mode, the target discharge temperature of the evaporator 8 is fixed to +12° C. In the range between $H_2$ and $C_5$, the evaporator discharge temperature is set to a value determined by the automatic control and hence does not involve any restriction. When the heat part setting temperature is lower than $C_5$, the target discharge temperature of the evaporator 8 is set to 3° C. or a value which is obtained under the low temperature demist control mode.

The restriction of the flow rate of the blower 7 is performed in terms of applied voltage of the blower. As shown in FIG. 15, when the head part setting temperature Ths is in the range between $H_3$ and $C_3$ the applied voltage is restricted to 4.8 V. In the range between $H_3$ and $H_4$, the applied voltage rises from 4.8 V to 7.8 V upon shifting and 20 seconds thereafter, the applied voltage is lowered to 5.8 V. Similarly, in the range between $H_4$ and $h_5$, the applied voltage rises from 5.8 V to 10.5 V upon shifting and 20 seconds thereafter, the applied voltage is lowered to 7.8 V. In the range between $C_3$ and $C_4$, the applied voltage of the blower 7 rises from 4.8 V to 7.8 V upon shifting and 20 seconds thereafter, the applied voltage is lowered to 5.8 V. Likewise, in the range between $C_4$ and $C_5$, the applied voltage rises from 5.8 V to 10.5 V and 20 seconds thereafter, the applied voltage is lowered to 7.8 V. The temporaryly rising of the applied voltage of the blower 7 is to create a strong stream of discharge air for a predetermined period of time so that the occupant senses an enhanced change of the state of air-conditioning operation when the head part temperature setter 39 is actuated.

If the upper part temperature setter 39 which is to be shifted from $H_1$ to $H_2$ overruns to $H_3$ and immediately thereafter is returned to $H_2$, the applied voltage of the blower 7 rises to 7.8 V and hence a strong stream of air is discharged. However, the discharge of such a strong stream of air does not continue for 20 seconds because the applied voltage of the blower 7 is immediately lowered to 4.8 V (see FIG. 15). Such immediate recovery of the desired applied voltage occurs also at the shifting between $H_5$ and $H_4$, between $C_2$ and $C_3$, and between $C_4$ and $C_5$.

Figure 16:
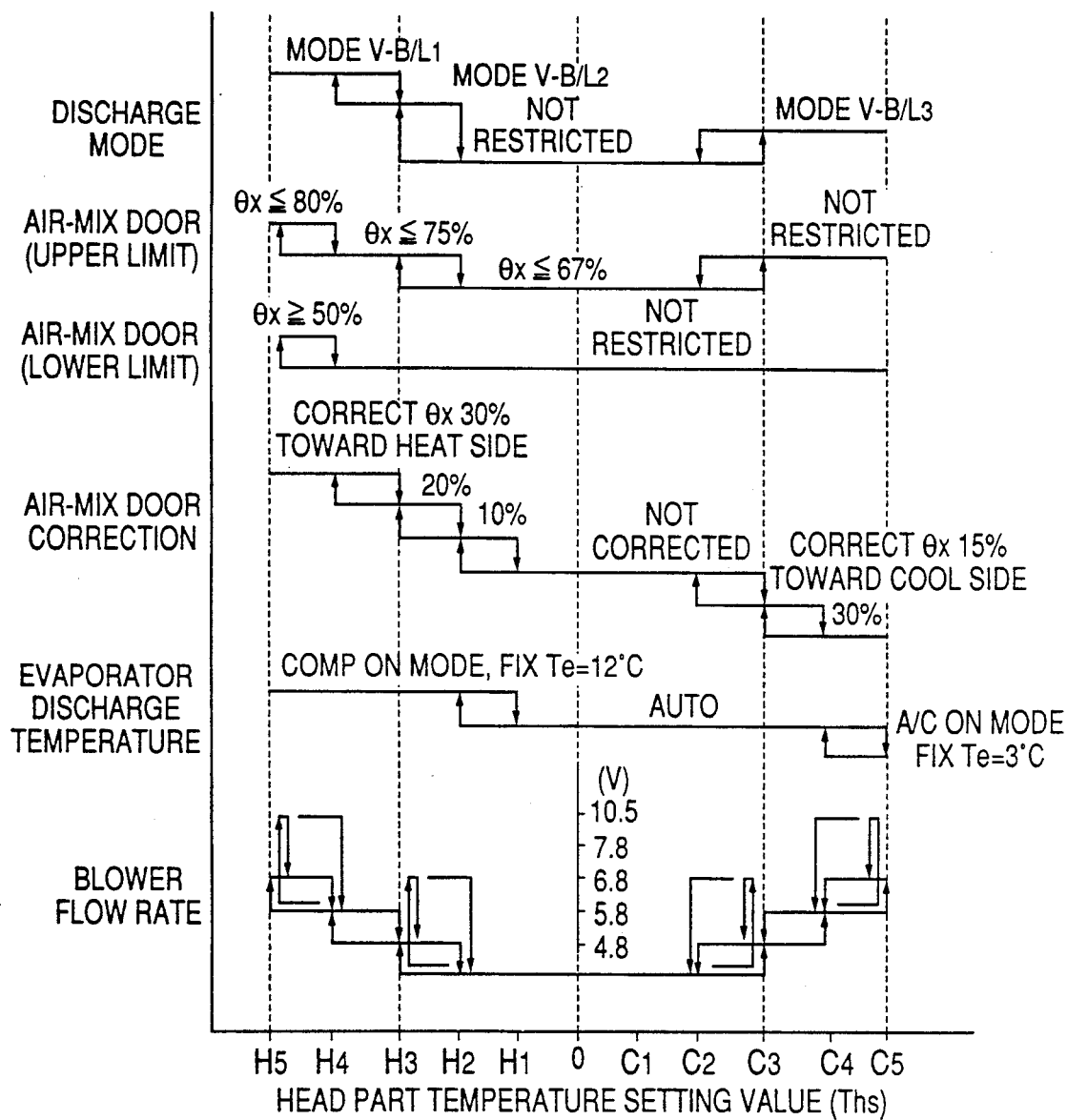
FIG. 16 is a graph showing various characteristic curves of the air-conditioner while it is operating in the second enhanced control mode.

The second enhanced control is used to enhance the effects of the first enhanced control described above and, as shown in FIG. 16, it differs from the first enhanced control in the following point. The opening $\theta x$ of the air-mix door 10 is restricted in its lower limit to $\theta x \geq 50$ when the head part setting temperature is above $H_5$. Additionally, in the range between $H_2$ and $H_3$, the opening $\theta x$ of the air-mix door 10 is corrected by 10% toward the heat side. Similarly, in the range between $H_3$ and $H_4$, the opening $\theta x$ of the air-mix door 10 is corrected by 30% toward the heat side.

The performance characteristics described above with respect to the moderate control and the first and second enhanced controls are obtained when the dial 47 of the head part temperature setter 39 is turned from the zero point in either heating or cooling direction toward $H_5$ or $C_5$. These performance characteristics which are obtained when the dial 47 is returned from the $H_5$ or $C_5$ position to the zero point are shifted by one notch from the performance characteristics obtained when the dial 47 is turned in the forward direction. With this hysteresis characteristic, hunching of the components of the air-conditioner can be avoided.

As described above, when the starting control is not completed, the zero notch control is adopted. The components of the air-conditioner are, therefore, controlled automatically by the total signals $T_1$ and $T_2$ without involving any correction or restriction. If the head part temperature setter 39 is actuated in error before the starting control is complete, then the moderate control is performed. With this moderate control, a sense of incompatibility is not imparted to the occupant. After the starting operation, the voltage of the blower is increased. In case the flow rate of the blower does not reach to an intermediate level, the air-conditioner is operating in the transient state. In this instance, the moderate control is adopted. When the flow rate of the blower reaches to the intermediate level, a substantially stable air-conditioning operation is obtained. In this instance, the control mode is shifted to the first enhanced control or the second enhanced control when the head part temperature setter 39 is actuated. Thus, each time when the head part temperature setter is actuated, a change of the state of air-conditioning is enhanced so that the product value of the air-conditioner is increased.

Obviously, various modifications and variations of the present invention are possible in the light of the above teaching. It is therefore to be understood that within the scope of the appended claims the present invention may be practiced otherwise than as specifically described.

What is claimed is:

1. An air-conditioner for an automobile, comprising:
  (a) an air-conditioning unit including an air-flow passage having upper and lower air outlets opening to a passenger compartment of the automobile, said upper air outlet being distinct from defrost outlets of the automobile, said air-conditioner unit having means for selectively heating and cooling air as the air flows downwardly through said air-flow passage so that the temperature of the air is regulated before the air is discharged from one of said upper and lower air outlets;
  (b) a bypass passage for leading air to said upper outlet directly from a first portion of said air-flow passage which is located upstream of a second portion where the air is heated, said bypass passage having a bypass door for opening and closing said bypass passage;
  (c) head part temperature setting means for setting a temperature of the head part of an occupant so as to control said opening of said bypass door;
  (d) total signal calculation means for calculating a total signal corresponding to a thermal load in the passenger compartment based on at least temperature signals representing a vehicle passenger compartment temperature and a setting temperature;
  (e) air-conditioning control calculation means for calculating various control modes of components of said air-conditioning unit by using said total signal as at least one factor;
  (f) correction/restriction control calculation means responsive to a setting of said head part temperature setting means for calculating one of a correction variable and a restriction variable for correcting or restricting at least part of the control modes of said components of said air-conditioning unit which are calculated by said air-conditioning control calculation means, said correction/restriction control calculation means including, at least, enhanced control calculation means for calculating a relatively large correction variable or a relatively large restriction variable, and moderate control calculation means for calculating a relatively small correction variable or a relatively small restriction variable;

(g) control mode selection means for selecting an output from said enhanced control calculation means in place of an output from said moderate control calculation means when said head part temperature setting means operates after the control of said air-conditioner reaches to a substantially stable condition;

(h) correction/restriction controlled variable determination means responsive to the result of selection by said control mode selection means for determining a controlled variable through a correction or a restriction of said at least part of the various control modes of the components of said air-conditioning unit which are calculated by said air-conditioning control calculation means; and (i) drive means for driving said air-conditioning unit based on the controlled variable obtained by said correction/restriction controlled variable determination means.

2. An air-conditioner according to claim 1, further including outside air temperature sensor for detecting a temperature outside the automobile, wherein said enhanced control calculation means includes a plurality of control patterns each of which is selected according to the temperature detected by said outside air temperature sensor.

* * * * *